United States Patent
Gyllenskog et al.

(10) Patent No.: US 7,502,451 B2
(45) Date of Patent: Mar. 10, 2009

(54) INSTITUTIONAL ELECTRONIC MESSAGING SYSTEM

(75) Inventors: Joel Gyllenskog, Boise, ID (US); Larry Larsen, Boise, ID (US); Randall D. Barber, Boise, ID (US); Albert Pittman, Boise, ID (US); James Graham, Boise, ID (US)

(73) Assignee: Microworks, Inc., Boise, ID (US)

( * ) Notice: Subject to any disclaimer, the term of this patent is extended or adjusted under 35 U.S.C. 154(b) by 565 days.

(21) Appl. No.: 11/308,505

(22) Filed: Mar. 30, 2006

(65) Prior Publication Data

US 2007/0233610 A1  Oct. 4, 2007

(51) Int. Cl.
*H04M 11/00* (2006.01)

(52) U.S. Cl. ............ 379/100.08; 705/64; 705/408; 705/406; 379/199; 707/9; 382/101; 709/206

(58) Field of Classification Search ............ 379/100.08, 379/199; 705/64, 408, 406; 707/9; 709/206; 382/101
See application file for complete search history.

(56) References Cited

U.S. PATENT DOCUMENTS

| | | | |
|---|---|---|---|
| 5,805,810 A * | 9/1998 | Maxwell ............... 709/206 |
| 5,944,787 A * | 8/1999 | Zoken ................. 709/206 |
| 6,285,777 B2 * | 9/2001 | Kanevsky et al. ......... 382/101 |
| 6,604,132 B1 * | 8/2003 | Hitt ................... 709/206 |
| 6,665,380 B1 * | 12/2003 | Cree et al. ............. 379/88.25 |
| 6,668,045 B1 * | 12/2003 | Mow ................... 379/88.19 |
| 6,920,209 B1 | 7/2005 | Gainsboro |
| 7,158,621 B2 * | 1/2007 | Bayne ................. 379/114.13 |
| 7,359,494 B2 * | 4/2008 | Leonard ............... 379/144.02 |
| 2005/0238154 A1 | 10/2005 | Kermit |
| 2006/0245559 A1 * | 11/2006 | Hodge et al. ........... 379/88.19 |
| 2006/0256940 A1 * | 11/2006 | Pekarovic et al. ........ 379/88.26 |

* cited by examiner

*Primary Examiner*—Olisa Anwah
(74) *Attorney, Agent, or Firm*—Hunstman Law Group, PLLC; Robert A. Huntsman

(57) ABSTRACT

An electronic messaging system for both participating institutions and nonparticpating institutions and their populations. When an institution is participating in the system of the present invention, both message senders and recipients are authenticated and known and verified before any communication can take place. Messages for institutions not currently participating in the system are converted to printed mail for delivery to the non-participating institution using traditional postal systems. The present invention also teaches novel message processing techniques that take advantage of the electronic format of the messages to provide automated security and translation and/or transliteration services and further teaches the novel feature of marking incoming messages with a code to assist in accurately and secure delivery of reply messages to the appropriate party.

32 Claims, 2 Drawing Sheets

INSTITUTIONAL ELECTRONIC MESSAGING SYSTEM

BACKGROUND OF THE INVENTION

Telephone communications systems for specialized institutions are well known in the art. In particular, the special circumstances of an institution population, such as prison inmates, render traditional telephone systems ineffective or useless. Traditional billing systems cannot be used in such environments for a number of reasons. Inmates are often indigent and are always subject to severe restraints and conditions for placing calls and typically are not allowed to receive incoming calls except under very rare and special conditions. Furthermore, telephone privileges are useful as a correctional tool. The institutional administrators grant or revoke privileges to encourage desired behavior amongst the inmates. Special problems are posed when inmates communicate in a language foreign to the institutional workers, making it increasingly difficult to monitor content, often requiring hiring workers with specialized language skills to perform monitoring messages, an expensive undertaking that is more often than not limited by financial constraints of the institution.

Telephone communications suffers from these limitations and further requires significant resources to monitor the content of the calls and also generally requires additional labor to transport and monitor inmates to an appropriate telephone bank.

With the advent of the internet, electronic messaging (e-mail) has become a very useful interpersonal communication technique and is a very desirable substitute for telephonic communications in many circumstances. However, members in many controlled institutions do not have general purpose internet access. However, electronic messaging, when properly managed and administered, can serves as either an alternative or replacement for telephonic communications between the institutional population and their outside friends and family members. A particularly attractive feature of electronic messaging as it relates to institutional use is that the caller/sender and the receiver/recipient do not have to meet at the same chronological time. Thus institutions can schedule time for message transmission or receipt at times convenient to the institution without regard to the availability of outside parties.

U.S. Pat. No. 6,668,045 (the '045 patent) describes a first generation technology that teaches a system for using electronic messaging in an institution. Unfortunately, the '045 patent suffers from many of the same limitations as it telephonic counterpart. Each communication still needs to be monitored, and only institutions that affirmatively adopt the technology can participate, thus severely limiting the application of the technology. Furthermore, when traditional client server email systems are used utilizing popular e-mail protocols such as SMTP and POP3, there is not a persistent electronic connection between the sender and receiver, and it much more difficult to identify the actual recipient of an outgoing message or the actual sender of an incoming messages. The lack of ability to securely and accurately authenticate the parties of an electronic communications poses unacceptable security risks in a prison setting. What is needed is an institutional-friendly electronic messaging system that overcomes the limitations of existing systems.

BRIEF SUMMARY OF THE INVENTION

The present invention teaches an electronic messaging system bases on HTMP/HTTP protocols—internet web browsers and servers—rather than SMTP/POP3/IMAP e-mail protocols. When a the institution is participating in the system of the present invention, both message senders and recipients are required to log on to a web site and authenticate prior to using any services. Thus the actual parties are known and verified before any communication can take place. A particularly unique feature of the present system is that for institutions not currently participating in the system, messages can still be sent by the e-mail web client. The system, in this situation, converts them to printed mail systems for delivery to the non-participating institution using traditional postal systems.

The present invention also teaches novel message processing techniques that take advantage of the electronic format of the messages to provided automated security and translation and/or transliteration services. The present invention further teaches the novel feature of marking incoming messages with a code to assist in accurately and secure delivery of reply messages to the appropriate party.

BRIEF DESCRIPTION OF THE SEVERAL VIEWS OF THE INVENTION

DETAILED DESCRIPTION OF THE PREFERRED EMBODIMENT

Figure 1:
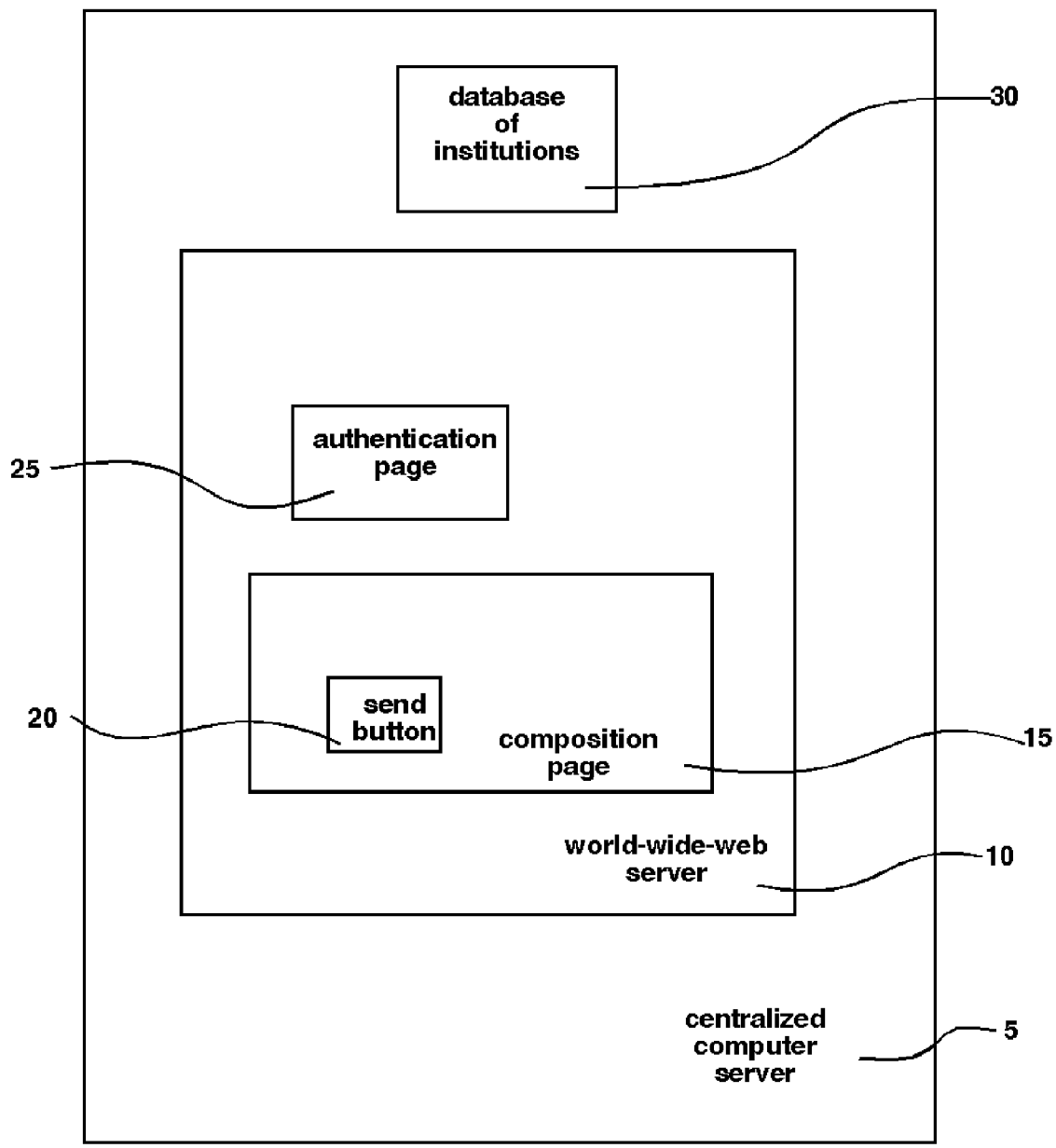
FIG. 1 shows generally the preferred embodiment of the present invention.

FIG. 1 shows generally the preferred embodiment of the present invention. Referring to FIG. 1, the centralized computer server 5 function as the world-wide-web server 10, which hosts the web-based system of the present invention. The web site includes an authentication page where users of the service identify themselves and authenticate by providing an authorized user name and password. Users have access to a number of functions while logged on including the ability to read mail and compose new messages. The composition page 15 is available to compose new outgoing messages by a variety of means, including typing the new message directly in using the page or copying and pasting message text written with another tool. Once a suitable message is composed, the message is transmitted to the system with the send button 20.

Part of the message composition includes addressing the message to an appropriate recipient, a member of an institution known to the system. The system examines the target institution and consults the database of institutions 30 to determine the method of delivery.

Figure 2:
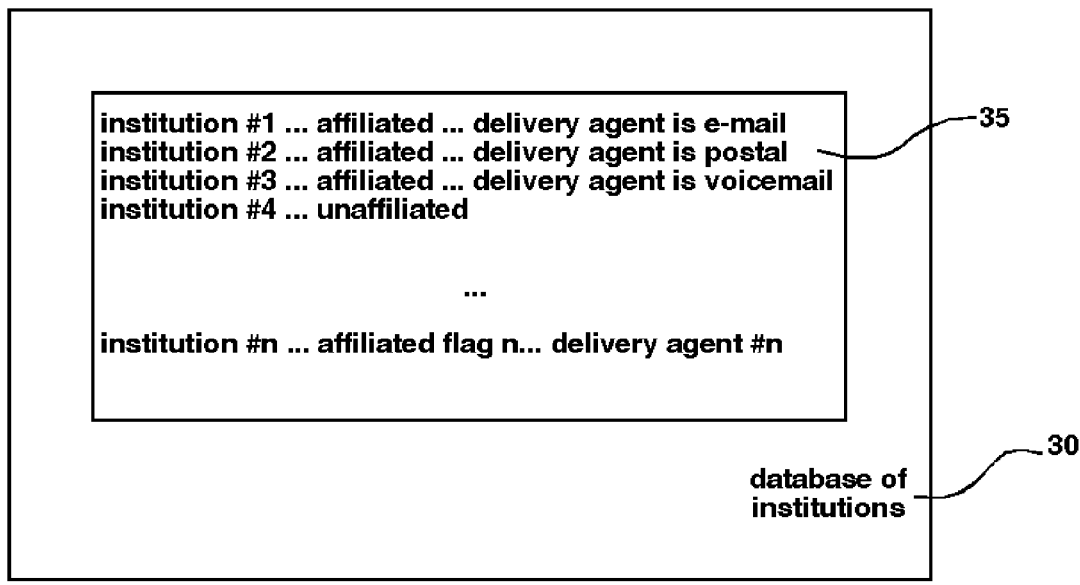
FIG. 2 illustrates the database of institutions of the preferred embodiment illustrating generally the privileges administration system of the present invention.

FIG. 2 illustrates figurative the contents of the database of institutions 30. Contents 35 of the database include a record for all institutions of a particular industry whether they are active participants of the service of the present invention or not. Each institution has an affiliation status which tells the system whether or not the institution is an affiliate, participating member of the service. If the institution is affilated, then the record further includes the preferred delivery agent. Typically—and in the preferred embodiment of the invention—the preferred delivery agent is e-mail, but the invention also contemplates allows alternate deliver methods including, but not limited to, voice mail and traditional postal delivery. The database may contain other information including a list of institutional member, accounting information, privileges and so forth (not shown).

The preferred embodiment includes the novel use of translation and/or transliteration. Transliteration is a process where individual words are translated, but the result is not generally a syntactic or semantic sentence in the targeted language. Transliteration is easier to implement and is less resource intensive than full language translation, and it used in the preferred embodiment, although translation is contemplated as well in the present invention. The following scenario illustrates typical usage of transliteration in the preferred embodiment.

Scenario #1:

Aunt Maria get on 4inmates.com, a web site implementing the present invention, and sends a message in Spanish to her nephew Pablo who in inmate in a penal institution. The message is downloaded by a clerk in the mail room at the institution. The clerk doesn't read Spanish, so he selects the transliteration to be performed from a pulldown list. He selects "Spanish to English". The message on his screen is shown in English. He scans the words as a security measure. It looks OK to him, so he specifies that it can be allowed to proceed. The message is printed in Spanish and delivered to Pablo. In the preferred embodiment, the automated scanners that use a novel method of highlighting also are implemented to detect and flag predetermined key words that may indicate security problems. The following scenario illustrates typical usage of highlighting in the preferred embodiment.

Scenario #2:

Aunt Mable sends a message to her nephew, inmate Billy Bob to the server of the present invention. Someone in the mail room at the targeted penal institution logs on and downloads the message from Aunt Mable. As the message is displayed words are highlighted. In the preferred embodiment, three different lists are used to determine which words to highlight, but any number of lists can be used. Each institution has a list of words to highlighted. Each institution can create groups. Each inmate can be put into one or more groups. Each group can have its own word list. Each individual can have a unique word list. After a quick scan of the message, the mailroom worker decides whether or not to allow the message to proceed. Mail room workers can add or delete words from any of the lists.

This description, including the scenarios, are provided by way of illustration but are not intended to limit the invention. The invention is only limited by the claims as set forth below.

What is claimed is:

1. A system for managing electronic messages associated with an institution, comprising:
    a centralized computer server, the computer server is configured to function as world-wide-web host,
    an authentication world-wide-web page associated with the computer server,
    a composition world-wide-web page associated with the computer server,
    a send button associated with at least one world-wide-web page associated with the computer server,
    a database of institutions wherein each institution is identified as either an affiliated or unaffiliated institution,
    wherein each affiliated institution has an associated preferred delivery agent,
    wherein a sender accesses the authentication page to authenticate to the centralized server, the sender presents a message to the composition page, the sender identifies an intended recipient of the message, wherein the intended recipient is associated with an institution, wherein the sender initiates transmission of the message by engaging the send button,
    wherein if the intended recipient is associated with an affiliated institution, the message is transmitted using the preferred delivery agent associated with the institution,
    wherein if the intended recipient is associated with an unaffiliated institution, the message is printed on paper and mailed to the unaffiliated institution.

2. The system of claim 1 wherein the delivery agent for an affiliated institution further includes a local computer server associated with the affiliated institution, wherein the computer server is configured to communicate with the centralized server, wherein the delivery agent delivers the electronic message electronically to the local computer server of the institution.

3. The system of claim 2 further includes an electronic privilege policy administrator, the privilege policy administrator is interfaced to the delivery agent, wherein the privilege policy administrator permits delivery of messages to the intended recipient of messages that satisfy the privilege policy administrator and blocks delivery of messages to the intended recipient for messages that fail to satisfy the privilege policy administrator.

4. The system of claim 3 wherein each affiliated institution has a preferred language, wherein the privilege policy administrator further includes a transliteration means wherein messages are electronically transliterated into the preferred language of the affiliated institution.

5. The system of claim 4 further includes a reply system wherein a reply message is formulated, the centralized computer system affixes an identifier to the message identifying the sender, wherein the reply system attaches the identifier to the reply message, wherein the centralized computer is enabled to deliver the reply message to the sender.

6. The system of claim 5 wherein the privilege policy administrator further includes a word highlighting system, the word highlighting system includes:
    one or more lists of candidate actions words,
    an electronic word scanner capable of detecting candidate action words appearing in a message,
    a display system having a display screen, the display system is interfaced to the word scanner, the display system is capable of displaying highlighted candidate actions words from a list detected in a message within the context of the message,
    wherein an agent of the institution can block message transmission based on a viewing of detected candidate words appearing on the display screen.

7. The system of claim 6 wherein members of the institution are arranged into logically groups and a candidate word list is assigned to each group.

8. The system of claim 4 wherein the privilege policy administrator further includes a word highlighting system, the word highlighting system includes:
    one or more lists of candidate actions words,
    an electronic word scanner capable of detecting candidate action words appearing in a message,
    a display system having a display screen the display system is interfaced to the word scanner, the display system is capable of displaying highlighted candidate actions words from a list detected in a message within the context of the message, wherein an agent of the institution can block message transmission based on a viewing of detected candidate words appearing on the display screen.

9. The system of claim 8 wherein members of the institution are arranged into logically groups and a candidate word list is assigned to each group.

10. The system of claim 3 further includes a reply system wherein a reply message is formulated, the centralized computer system affixes an identifier to the message identifying the sender, wherein the reply system attaches the identifier to the reply message, wherein the centralized computer is enabled to deliver the reply message to the sender.

11. The system of claim 10 wherein the privilege policy administrator further includes a word highlighting system, the word highlighting system includes:
one or more lists of candidate actions words,
an electronic word scanner capable of detecting candidate action words appearing in a message,
a display system having a display screen, the display system is interfaced to the word scanner, the display system is capable of displaying highlighted candidate actions words from a list detected in a message within the context of the message,
wherein an agent of the institution can block message transmission based on a viewing of detected candidate words appearing on the display screen.

12. The system of claim 11 wherein members of the institution are arranged into logically groups and a candidate word list is assigned to each group.

13. The system of claim 3 wherein the privilege policy administrator further includes a word highlighting system, the word highlighting system includes:
one or more lists of candidate actions words,
an electronic word scanner capable of detecting candidate action words appearing in a message,
a display system having a display screen, the display system is interfaced to the word scanner, the display system is capable of displaying highlighted candidate actions words from a list detected in a message within the context of the message,
wherein an agent of the institution can block message transmission based on a viewing of detected candidate words appearing on the display screen.

14. The system of claim 13 wherein members of the institution are arranged into logically groups and a candidate word list is assigned to each group.

15. The system of claim 2 wherein each affiliated institution has a preferred language, wherein the privilege policy administrator further includes a transliteration means wherein messages are electronically transliterated into the preferred language of the affiliated institution.

16. The system of claim 15 further includes a reply system wherein a reply message is fomulated, the centralized computer system affixes an identifier to the message identifying the sender, wherein the reply system attaches the identifier to the reply message, wherein the centralized computer is enabled to deliver the reply message to the sender.

17. The system of claim 2 further includes a reply system wherein a reply message is formulated, the centralized computer system affixes an identifier to the message identifying the sender, wherein the reply system attaches the identifier to the reply message, wherein the centralized computer is enabled to deliver the reply message to the sender.

18. The system of claim 1 further includes an electronic privilege policy administrator, the privilege policy administrator is interfaced to the delivery agent, wherein the privilege policy administrator permits delivery of messages to the intended recipient of messages that satisfy the privilege policy administrator and blocks delivery of messages to the intended recipient for messages that fail to satisfy the privilege policy administrator.

19. The system of claim 18 wherein each affiliated institution has a preferred language, wherein the privilege policy administrator further includes a transliteration means wherein messages are electronically transliterated into the preferred language of the affiliated institution.

20. The system of claim 19 further includes a reply system wherein a reply message is formulated, the centralized computer system affixes an identifier to the message identifying the sender, wherein the reply system attaches the identifier to the reply message, wherein the centralized computer is enabled to deliver the reply message to the sender.

21. The system of claim 20 wherein the privilege policy administrator further includes a word highlighting system, the word highlighting system includes:
one or more lists of candidate actions words,
an electronic word scanner capable of detecting candidate action words appearing in a message,
a display system having a display screen the display system is interfaced to the word scanner, the display system is capable of displaying highlighted candidate actions words from a list detected in a message within the context of the message,
wherein an agent of the institution can block message transmission based on a viewing of detected candidate words appearing on the display screen.

22. The system of claim 21 wherein members of the institution are arranged into logically groups and a candidate word list is assigned to each group.

23. The system of claim 19 wherein the privilege policy administrator further includes a word highlighting system, the word highlighting system includes:
one or more lists of candidate actions words,
an electronic word scanner capable of detecting candidate action words appearing in a message,
a display system having a display screen, the display system is interfaced to the word scanner, the display system is capable of displaying highlighted candidate actions words from a list detected in a message within the context of the message,
wherein an agent of the institution can block message transmission based on a viewing of detected candidate words appearing on the display screen.

24. The system of claim 23 wherein members of the institution are arranged into logically groups and a candidate word list is assigned to each group.

25. The system of claim 18 further includes a reply system wherein a reply message is formulated, the centralized computer system affixes an identifier to the message identifying the sender, wherein the reply system attaches the identifier to the reply message, wherein the centralized computer is enabled to deliver the reply message to the sender.

26. The system of claim 25 wherein the privilege policy administrator further includes a word highlighting system, the word highlighting system includes:
one or more lists of candidate actions words,
an electronic word scanner capable of detecting candidate action words appearing in a message,
a display system having a display screen, the display system is interfaced to the word scanner, the display system is capable of displaying highlighted candidate actions words from a list detected in a message within the context of the message, wherein an agent of the institution can block message transmission based on a viewing of detected candidate words appearing on the display screen.

27. The system of claim 26 wherein members of the institution are arranged into logically groups and a candidate word list is assigned to each group.

28. The system of claim 18 wherein the privilege policy administrator further includes a word highlighting system, the word highlighting system includes:

one or more lists of candidate actions words, an electronic word scanner capable of detecting candidate action words appearing in a message, a display system having a display screen, the display system is interfaced to the word scanner, the display system is capable of displaying highlighted candidate actions words from a list detected in a message within the context of the message, wherein an agent of the institution can block message transmission based on a viewing of detected candidate words appearing on the display screen.

29. The system of claim 28 wherein members of the institution are arranged into logically groups and a candidate word list is assigned to each group.

30. The system of claim 1 wherein each affiliated institution has a preferred language, wherein the privilege policy administrator further includes a transliteration means wherein messages are electronically transliterated into the preferred language of the affiliated institution.

31. The system of claim 30 further includes a reply system wherein a reply message is formulated, the centralized computer system affixes an identifier to the message identifying the sender, wherein the reply system attaches the identifier to the reply message, wherein the centralized computer is enabled to deliver the reply message to the sender.

32. The system of claim 1 further includes a reply system wherein a reply message is formulated, the centralized computer system affixes an identifier to the message identifying the sender, wherein the reply system attaches the identifier to the reply message, wherein the centralized computer is enabled to deliver the reply message to the sender.

* * * * *